W. L. DYSART AND J. F. O'HANLON.
INSPECTION LAMP.
APPLICATION FILED JUNE 15, 1920.
1,363,098. Patented Dec. 21, 1920.
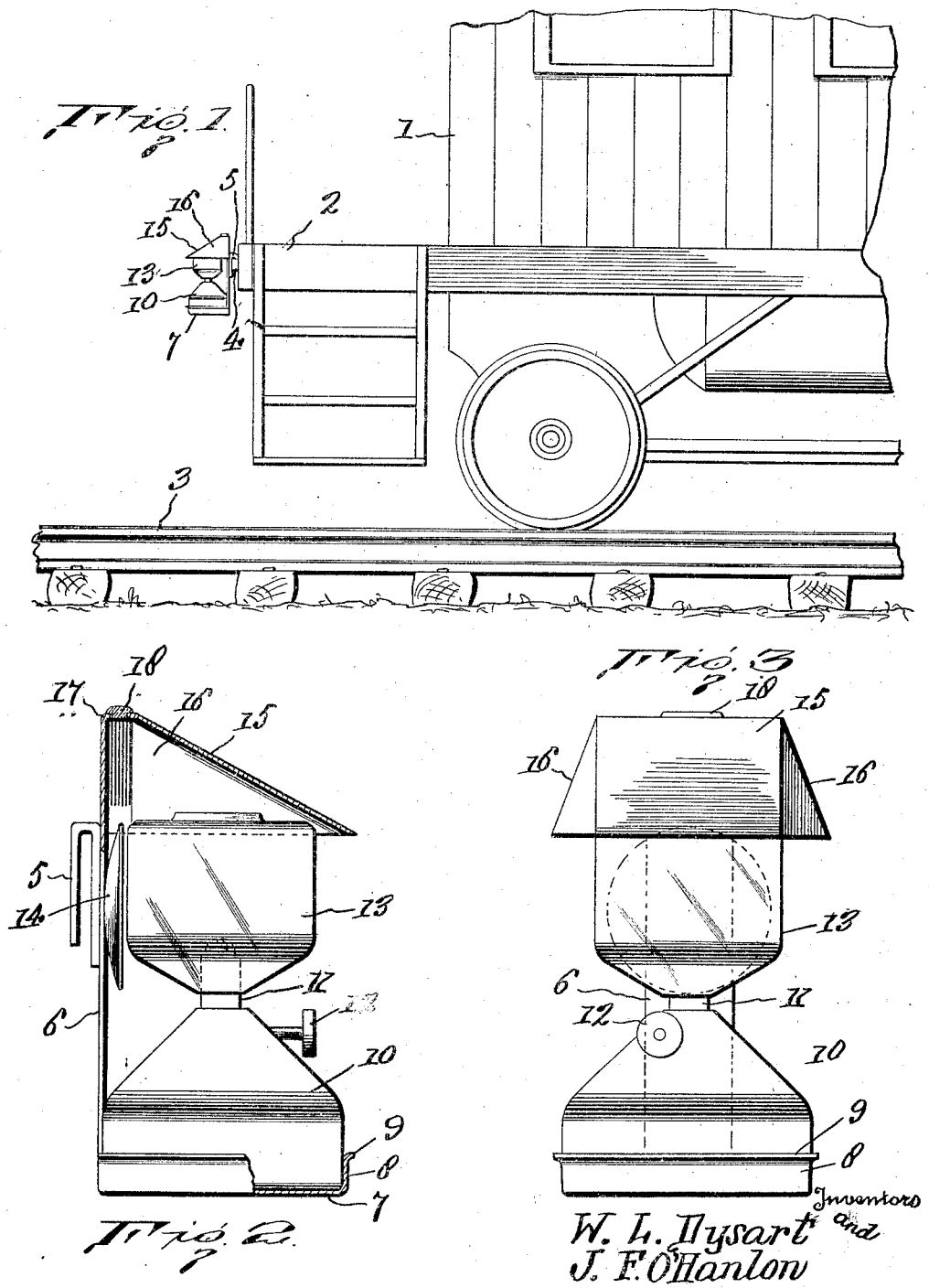

UNITED STATES PATENT OFFICE.

WILLIAM L. DYSART AND JOHN F. O'HANLON, OF HARLOWTON, MONTANA.

INSPECTION-LAMP.

1,363,098.  Specification of Letters Patent.  Patented Dec. 21, 1920.

Application filed June 15, 1920. Serial No. 389,149.

*To all whom it may concern:*

Be it known that we, WILLIAM L. DYSART and JOHN F. O'HANLON, citizens of the United States, both residing at Harlowton, in the county of Wheatland and State of Montana, have invented certain new and useful Improvements in Inspection-Lamps; and we do hereby declare the following to be a full, clear, and exact description of the invention, such as will enable others skilled in the art to which it appertains to make and use the same.

The present invention relates to improvements in inspection lamps, and has for an object to provide a lamp for attachment to the rear ends of freight trains and passenger trains for the purpose of showing the condition of the track to members of the train crew occupying the caboose, who may by this means ascertain defective equipment in any of the car trucks which is evidenced by the destruction of the rails, ties, or the road bed generally.

Long freight trains have been known to travel for miles with defective trucks, or trucks that have jumped the rails, to the injury or destruction of the road bed, and this condition has not been discovered by the train crew owing to the fact that the truck in question is situated possibly midway of the train. Conditions of this kind are not capable of being readily discovered, especially at night, and it is the purpose of the invention to provide a lamp that may be attached to the caboose having a shade or deflector adapted to illuminate the road bed in rear of the train, and having an attention light associated therewith to call the workmen's attention to the illuminated road bed and adapted to put them in the habit of examining the same.

A further object of the invention is to provide a simple and inexpensive lamp having a combined holder and deflector or shade with an attention light placed in the top of the shade.

In the accompanying drawings forming a part of this application, and in which similar reference symbols indicate corresponding parts in the several views:

Figure 1 is a fragmentary side view of a caboose having an improved inspection lamp applied thereon.

Fig. 2 is a side view, with parts in section, of the improved lamp; and

Fig. 3 is a rear view thereof.

Referring more particularly to the drawings, 1 designates generally a caboose having a back platform 2 and traveling on the track 3.

In accordance with the invention the rear end of the platform 2 is provided with a bracket or eye 4 to receive a hook of a corresponding bracket 5 fixed on a vertical post 6 forming part of the improved inspection lamp. The post 6 is connected or formed at its lower end with a base 7 having a marginal upstanding flange 8 with an outturned upper lip 9 in which is received the oil reservoir 10 of a lamp. The wick tube is indicated at 11 and the operating handle or button for the wick at 12.

The lamp is further provided with a chimney 13 and a concavo-convex or other reflector 14 is placed behind the chimney 13 and wick tube 11, it being carried by the post 6 opposite to the hook-shaped bracket 5.

The position of the reflector 14 is such that it will direct the rays from the wick rearwardly and downwardly upon the track 3 and to opposite sides, so as to illuminate the full breadth of the road bed.

At the top of the post 6, and preferably formed in one piece therewith, is a hood or deflector having an inclined top wall 15 projecting slightly beyond the chimney 13, and being so formed as to throw the rays from the lamp downwardly on the road bed. The hood is also inclosed by sides 16 which incline outwardly and downwardly, and act to spread the light out in a fan-shape arrangement so as to include the ends of the ties projecting beyond the rails 3.

A portion of the hood adjacent the upper end of the post 6, extends horizontally and is perforated centrally to receive a red lens or bull's-eye 18. This lens is also adapted to receive light from the oil lamp which is reflected upwardly by the sloping interior wall 15, and acts to display a red light observable by members of the crew standing on or about the platform 2 of the caboose.

The purpose of this red light is to attract the attention of the workmen to the inspection lamp, and to form in them the habit of observing the road bed as the train proceeds, whenever their duties carry them onto the rear platform 2. By the timely observation by workmen of the road bed 3 under the illumination of the improved lamp, any damaged condition to the ties or rails resulting in a defective or derailed truck of the cars of the train, will be the means of stopping the train and having the truck repaired or replaced on the rails before further injury is done to the road bed.

The invention thus effects a great saving in ties due to replacements where conditions of this kind are not discovered in time, and proportionate saving in labor.

Of course the lamp need not be an oil lamp, but may be an electric or other form of light.

The hood or deflector is also so placed with reference to the wick or source of light, that it will prevent the light from shining in such a way out toward the rear that the engineer of a following train might be confused.

It is obvious that those skilled in the art may vary the details of construction and arrangements of parts without departing from the spirit of our invention, and therefore we do not wish to be limited to such features except as may be required by the claims.

We claim:

1. In combination with a railway car, of a bracket secured on the end of the rear platform, a second complementally formed hook-shaped bracket removably fitted in the first mentioned bracket, a post carried by the second bracket, a holder at the lower end of the post, a lamp held in said holder, a reflector on the post, a hood above the lamp and carried by the upper end of the post for deflecting rays of light downwardly onto the road bed, and means in the hood for transmitting rays of light upwardly where they may be observed from the platform of a car, substantially as described.

2. In combination with a railway car having a rear platform, of a bracket carried at the end of the rear platform, a second bracket removably mounted in the first mentioned bracket, a post connected to the second mentioned bracket, a base extending horizontally from the lower end of said post and having a flange with an outwardly curled lip at the upper edge thereof, a lamp placed in said post and held in position by said flange, a reflector at the rear side of said post, a hood carried by the upper end of said post and having an upper wall inclining rearwardly and side walls inclining outwardly, said hood having a horizontal portion adjacent the post provided with an opening, and a red lens in the opening in position to receive light rays from the lamp, substantially as described.

WILLIAM L. DYSART.
JOHN F. O'HANLON.